United States Patent [19]
Tank et al.

[11] Patent Number: 5,232,320
[45] Date of Patent: Aug. 3, 1993

[54] CUTTING INSERT FOR A ROTARY CUTTING TOOL

[76] Inventors: Klaus Tank, 9 Warbleton Avenue, Essexwold, Johannesburg, Transvaal; Andrew I. Lloyd, 52 15th Street, Parkhurst, Johannesburg, Transvaal, both of South Africa

[21] Appl. No.: 798,590

[22] Filed: Nov. 26, 1991

[30] Foreign Application Priority Data

Nov. 26, 1990 [ZA] South Africa ............. 90/9475

[51] Int. Cl.$^5$ ............................................. B23B 51/02
[52] U.S. Cl. ................................... 408/145; 407/118; 408/227
[58] Field of Search .......... 408/144, 148, 230, 229, 408/227; 76/DIG. 12, 108.1, 108.6; 407/118; 175/410, 396

[56] References Cited

U.S. PATENT DOCUMENTS

| | | | |
|---|---|---|---|
| 1,887,373 | 11/1932 | Emmons et al. | 407/118 X |
| 4,478,298 | 10/1984 | Hake et al. | 175/410 X |
| 4,565,471 | 1/1986 | Negishi et al. | 408/227 |
| 4,604,106 | 8/1986 | Hall et al. | 175/329 X |
| 5,022,801 | 6/1991 | Anthony et al. | 408/227 |
| 5,065,647 | 11/1991 | Johnson | 408/145 |

FOREIGN PATENT DOCUMENTS

| | | | |
|---|---|---|---|
| 66805 | 4/1982 | Japan | 408/144 |
| 177213 | 10/1983 | Japan | 408/144 |
| 59308 | 4/1984 | Japan | 408/144 |
| 842133 | 7/1960 | United Kingdom | 408/227 |
| 2085769 | 5/1982 | United Kingdom | 408/144 |

*Primary Examiner*—Daniel W. Howell
*Attorney, Agent, or Firm*—Scully, Scott, Murphy & Presser

[57] ABSTRACT

A cutting insert for a rotary cutting tool comprises a body of tungsten carbide, with layers of polycrystalline diamond on opposite sides of the body. The diamond layers overlap across the centre-line of the insert. The cutting insert is shaped for retention at the end of the rotary cutting tool so that the first and second sides of the cutting insert are substantially parallel to the axis of the cutting tool, and the diamond layers are offset from one another across the width of the body so that they define the lips or major cutting edges of the cutting tool.

9 Claims, 2 Drawing Sheets

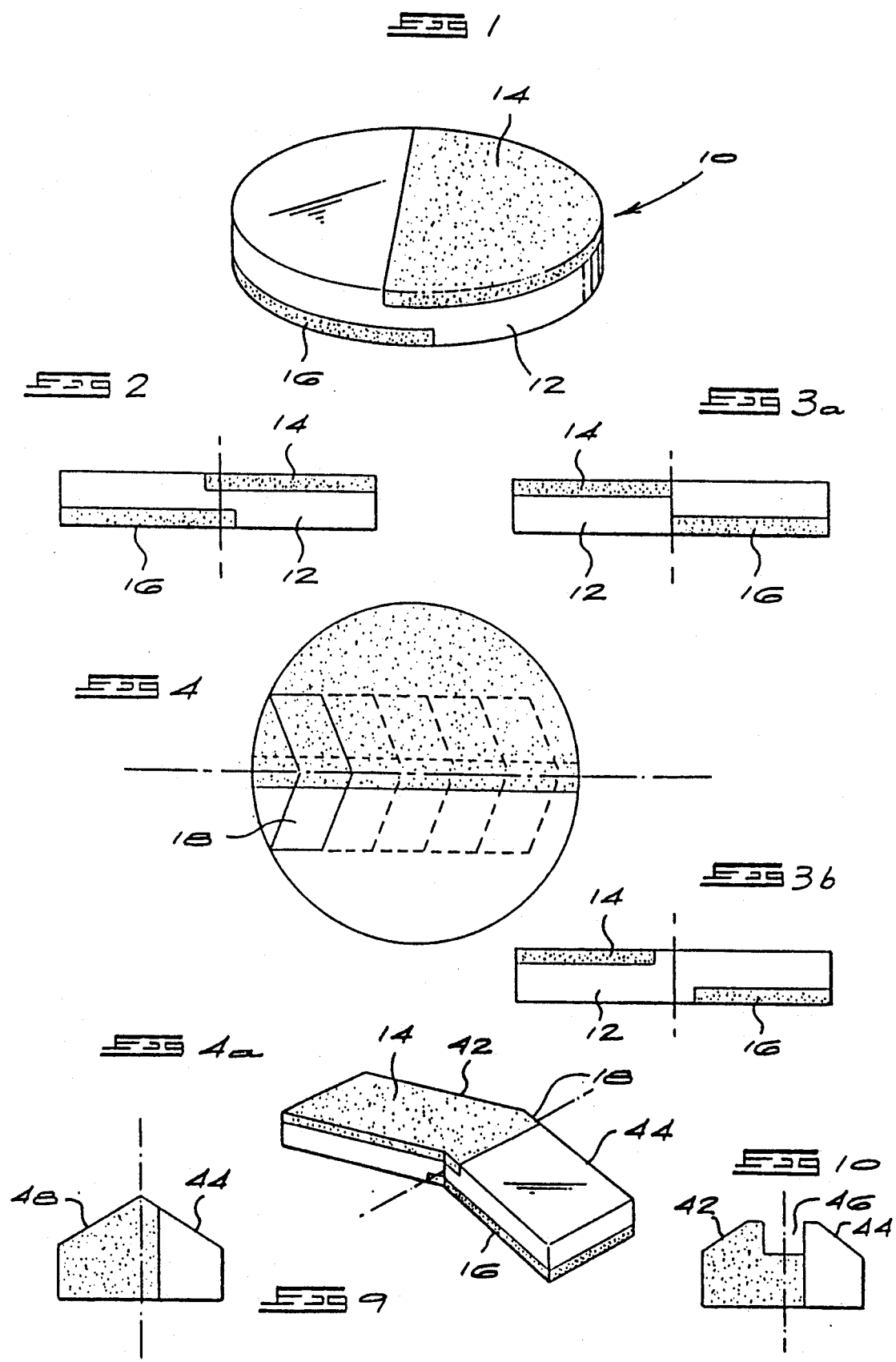

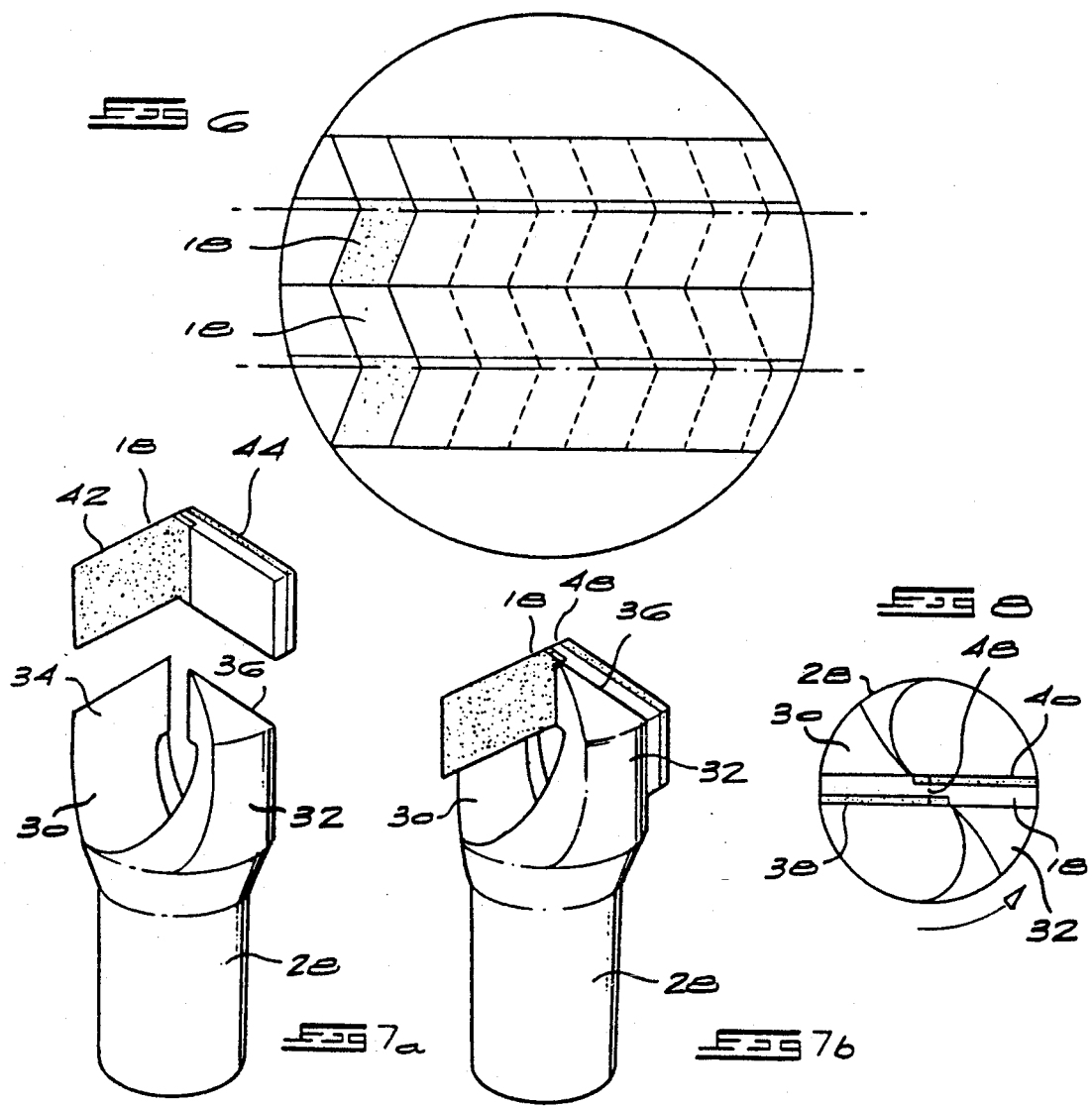

CUTTING INSERT FOR A ROTARY CUTTING TOOL

BACKGROUND OF THE INVENTION

This invention relates to a method of manufacturing a cutting insert for a rotary cutting tool, to a rotary cutting tool including the insert, and to the cutting insert itself.

Rotary cutting tools such as boring heads are known which comprise a cylindrical body defining a pair of arms, one on either side of a line passing diametrically through the body. On each arm is mounted a cutting insert comprising a body of polycrystalline diamond (PCD) material, such as a PCD compact comprising a PCD layer on a tungsten carbide backing. Other cutting tools such as twist drills are known which have an approximately chisel-type bit, with a pair of cutting inserts mounted in seats oriented more or less diametrally in the end of a twist drill body.

SUMMARY OF THE INVENTION

According to the invention a cutting insert for a rotary cutting tool comprises a body of relatively soft material, with layers of relatively hard material on opposite first and second sides thereof, the cutting insert being shaped for retention at the end of the rotary cutting tool so that the first and second sides of the cutting insert are substantially parallel to the axis of the cutting tool, the layers of relatively hard material being offset from one another so that they define the lips or major cutting edges of the cutting tool.

Preferably the cutting insert has a pair of cutting edges which define a generally wedge- or V-shape.

The cutting insert may be gable-shaped or chevron-shaped, for example.

Preferably, the layers of relatively hard material overlap across the centre-line of the insert.

In one version of the cutting insert, the insert defines a chisel edge comprising portions of the relatively hard material on either side of a central portion of the relatively soft material.

Typically, the relatively soft material comprises tungsten carbide and the relatively hard material comprises polycrystalline diamond.

Further according to the invention a rotary cutting tool has a body which is shaped to retain a cutting insert as defined above at an end thereof, the body defining a pair of opposed seating surfaces to which the insert is fixed so that the insert is disposed diametrally at the end of the cutting tool.

The body may have a pair of upstanding arms, each arm defining a seating surface to which a respective seating portion of the insert is fixed, for example, by brazing.

The invention extends to a method of manufacturing a cutting insert for a rotary cutting tool including providing a blank which comprises a body of relatively soft material and which has first and second opposed major surfaces, with first and second layers of relatively hard material on opposite sides of the body which define portions of the respective major surfaces; and cutting the blank to define a cutting insert having a body with first and second sides corresponding to the opposed major surfaces of the blank, so that the first and second sides of the insert include offset cutting edges formed from the respective first and second layers of relatively hard material.

Preferably, the first and second layers of relatively hard material in the blank are offset from one another across the thickness of the blank, the method comprising cutting the blank about a line equidistant from adjacent edges of the first and second layers.

BRIEF DESCRIPTION OF THE DRAWINGS

FIG. 1 is a pictorial view of a composite diamond compact blank used to form a cutting insert according to the invention;

FIG. 2 is a side view of the blank of FIG. 1;

FIGS. 3a and 3b are side views of alternative versions of the blank;

FIG. 4 is a top view of the blank of FIG. 1, showing the pattern of cutting of the blank;

FIG. 4a is a pictorial view of a single insert cut from the blank;

FIG. 5 is a pictorial view of a further embodiment of a blank for forming cutting inserts according to the invention;

FIG. 6 is a top view of the blank of FIG. 5, showing a cutting pattern therefor;

FIGS. 7a and 7b are exploded and assembled pictorial views of a boring head incorporating a cutting insert according to the invention;

FIG. 8 is an end view of the boring head of FIG. 7; and

FIGS. 9 and 10 are side views of alternative cutting inserts.

DESCRIPTION OF EMBODIMENTS

Referring first to FIG. 1, a polycrystalline diamond (PCD) composite blank 10 is disk shaped and comprises a body of tungsten carbide 12 with opposed generally flat faces. On each side of the disk, strip-shaped PCD layers 14 and 16 are formed in respective recesses in the flat faces. The layers 14 and 16 are generally semi-circular in plan. The layers 14 and 16 are formed on opposite sides of a diameter of the disk, but overlap slightly across the diameter, as seen clearly in FIG. 2.

FIGS. 3a and 3b show variations of the blank, in which the layers 14 and 16 do not overlap.

Referring now to FIG. 4, a cutting pattern is illustrated, superimposed on the blank of FIG. 1. According to the cutting pattern, a number of chevron-shaped cutting inserts 18 are laser cut, nose-to-tail, from the central portion of the blank, symmetrically about the diameter of the blank. A single cutting insert is shown pictorially in FIG. 4a. It can be seen that the insert has diamond layers 14 and 16 on opposite wings of the chevron which overlap across the centre-line of the insert. The insert has cutting edges 42 and 44.

FIGS. 5 and 6 illustrate an alternative version of the PCD blank, with a pair of strips of PCD material 2n and 22 formed in slots or channels on its upper surface, and a staggered pair of strips 24 and 26 in slots or channels on its lower surface. As shown in FIG. 6, two rows of cutting inserts can be cut from the single blank, about lines equidistant from adjacent overlapping edges of the strips of PCD material on opposite sides of the blank. This results in less wastage than the cutting pattern of FIG. 4.

The chevron-shaped cutting inserts are relatively easy to manufacture and minimise wastage of the PCD material. Of course, the inserts could have other shapes, as shown in FIGS. 9 and 10, for example. The insert of FIG. 9 is gable-shaped, while the insert of FIG. 10 is generally gable-shaped but has a central slot or notch 46 formed in its working end. However, al the illustrated cutting inserts have cutting edges which define a generally wedge- or V-shape.

FIG. 7 is a pictorial view of a boring head body 28 which has a pair of upstanding arms 30 and 32 which define opposed, staggered mounting faces 34 and 36 which lie on either side of a diameter of the body 28. As shown in FIG. 7b, when the cutting insert 18 is fitted into the seat defined by the arms 30 and 32 and their respective seating faces 34 and 36, the tungsten carbide faces of the inserts abut the seating surfaces 34 and 36, and the insert is brazed into position in the seat. A top view of the assembled boring head is shown in FIG. 8.

It can be seen that the major sides of the cutting insert are parallel to the axis of the boring head, and that the lips or major cutting edges 38 and 40 of the finished boring head are formed by the upper edges of the PCD layers 14 and 16 on either side of the body of the insert. In the case of cutting insert of FIG. 4a, the finished boring head has a chisel edge (48) which comprises portions of diamond material on either side of a central tungsten carbide portion, as shown. The illustrated cutting inserts have the particular advantage, compared to prior art cutting inserts, that they are formed as a single unit, and thus resist damage due to torsional stresses which can damage prior art rotary cutting tools employing twin inserts.

It will be understood that the cutting inserts of the invention can be fitted to a variety of cutting tools, such as twist drills, roof and face boring heads, endmills, routers and milling cutters, and that the described embodiments are purely exemplary.

It was found that the cutting tool of the present invention was extremely stable during collaring and drilling, generating little or no vibration compared to a two-wing prior art cutting tool. This is significant, particularly with respect to collaring, since it is believed that vibration and instability cause most of the chipping of the PCD cutting edges which occurs with prior art cutting tools. However, the prototype cutting of the present invention exhibited no evidence of chipping.

We claim:

1. A cutting insert for a rotary cutting tool comprising a body of relatively soft material, with layers of relatively hard material on opposite first and second sides thereof wherein the layers of relatively hard material overlap across the center-line of the insert, the cutting insert being shaped for retention at the end of the rotary cutting tool so that the first and second sides of the cutting insert are substantially parallel to the axis of the cutting tool, the layers of relatively hard material being offset from one another across the width of the body so that they define the lips or major cutting edges of the cutting tool.

2. A cutting insert according to claim 1 which is chevron-shaped.

3. A cutting insert according to claim 1 wherein the cutting insert defines a chisel edge comprising portions of the relatively hard material on either side of a central portion of the relatively soft material.

4. A cutting insert according to claim 1 wherein the relatively soft material comprises tungsten carbide and the relatively hard material comprises polycrystalline diamond.

5. A rotary cutting tool having a body which is shaped to retain a cutting insert for a rotary cutting tool comprising a body of relatively soft material, with layers of relatively hard material on opposite first and second sides thereof wherein the layers of relatively hard material overlap across the center-line of the insert, the cutting insert being shaped for retention at the end of the rotary cutting tool so that the first and second sides of the cutting insert are substantially parallel to the axis of the cutting tool, the layers of relatively hard material being offset from one another across the width of the body so that they define the lips or major cutting edges of the cutting tool at an end thereof, the body defining a pair of opposed seating surfaces to which the insert is fixed so that the insert is disposed diametrally at the end of the cutting tool.

6. A rotary cutting tool according to claim 5 wherein the body has a pair of upstanding arms, each arm defining a seating surface to which a respective seating portion of the insert is fixed.

7. A rotary cutting tool according to claim 6 wherein each respective seating portion of the insert is defined by the relatively soft material of the insert body.

8. A rotary cutting tool according to claim 5 wherein the insert is fixed to the seating surfaces of the cutting tool body by brazing.

9. A cutting insert for a rotary cutting tool comprising a body of relatively soft materials, with layers of relatively hard material on opposite first and second sides thereof wherein the layers of relatively hard material overlap across the center-line of the insert, the cutting insert being gable-shaped with a notch or slot formed centrally between the cutting edges, the insert also being shaped for retention at the end of the rotary cutting tool so that the first and second sides of the cutting insert are substantially parallel to the axis of the cutting tool, the layers of relatively hard material being offset from one another across the width of the body so they define the lips of major generally wedge-or V-shaped cutting edges of the cutting tool.

* * * * *